United States Patent
Hörsch et al.

(10) Patent No.: US 8,248,619 B2
(45) Date of Patent: Aug. 21, 2012

(54) LIGHT BARRIER

(75) Inventors: Ingolf Hörsch, Freiburg (DE); Stefan Jaegle, Denzlingen (DE); Rolf Meier, Ettenheim (DE); Gerhard Merettig, Sexau (DE); Philipp Fortenbacher, Gundelfingen (DE); Felix Lang, Schliengen (DE); Thomas Schulz, Waldkirch (DE)

(73) Assignee: Sick AG, Waldkirch (DE)

( * ) Notice: Subject to any disclaimer, the term of this patent is extended or adjusted under 35 U.S.C. 154(b) by 364 days.

(21) Appl. No.: 12/654,048

(22) Filed: Dec. 8, 2009

(65) Prior Publication Data

US 2010/0141964 A1  Jun. 10, 2010

(30) Foreign Application Priority Data

Dec. 9, 2008 (DE) .................. 10 2008 061 218

(51) Int. Cl.
G01B 11/14 (2006.01)
(52) U.S. Cl. ...................................... 356/615
(58) Field of Classification Search .................. None
See application file for complete search history.

(56) References Cited

U.S. PATENT DOCUMENTS

| 4,660,929 A | 4/1987 | Sick |
| 6,946,643 B1 | 9/2005 | Fayfield |
| 2004/0042010 A1 | 3/2004 | Wuestefeld |
| 2004/0070751 A1 | 4/2004 | Bergbach et al. |
| 2008/0252958 A1* | 10/2008 | Wiebking et al. ............. 359/223 |
| 2009/0008455 A1* | 1/2009 | Mayer et al. ............. 235/462.38 |

FOREIGN PATENT DOCUMENTS

| DE | 33 44 478 C2 | 6/1985 |
| DE | 196 27 083 A1 | 1/1998 |
| DE | 10 2004 012 220 A1 | 9/2005 |
| DE | 10 2005 012 952 A1 | 10/2005 |
| DE | 10 2005 005 906 A1 | 8/2006 |
| DE | 20 2006 020 342 U1 | 6/2008 |
| EP | 0 710 818 B1 | 5/1996 |
| WO | 0048934 A1 | 8/2000 |

OTHER PUBLICATIONS

European Search Report issued on Sep. 3, 2010 in counterpart European Application No. 09175885.4, seven (7) pages.

* cited by examiner

*Primary Examiner* — Tu Nguyen
(74) *Attorney, Agent, or Firm* — The Nath Law Group; Jerald L. Meyer; Stanley N. Protigal

(57) ABSTRACT

A light barrier detects an object which interrupts a beam of light of the light barrier. A light transmitter transmits a light beam in the direction of a reflector and a light receiver receives a reflected portion of the light beam. The improved light barrier has a reflector which is made as a cylindrical reflector column having a plurality of retroreflecting elements aligned toward the outer surface. The diameter of the reflector column is considerably smaller than the extent of the light beam perpendicular to the cylinder axis so that an optically effective detection beam of light is formed between the sensor and the reflector column whose cross-section at the sensor is determined by the light transmitter and, in direct proximity to the reflector column. The cross-section is determined by the areal overlap of the light beam with the reflector column.

8 Claims, 3 Drawing Sheets

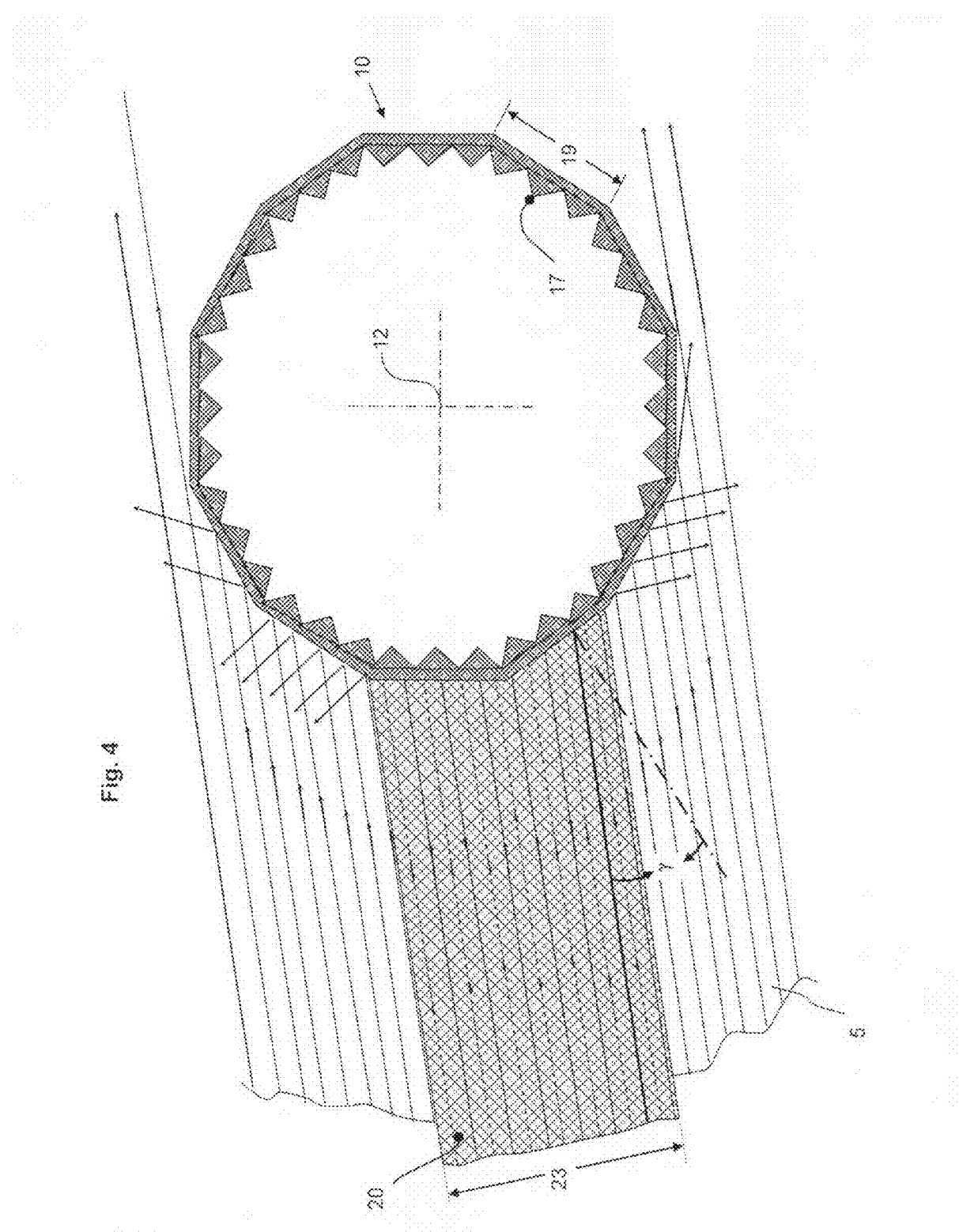

LIGHT BARRIER

BACKGROUND

1. Field

The present disclosure relates to a light barrier for the detection of an object which interrupts a beam of light, and which has a sensor with an evaluation unit for the evaluation of a reflected light beam.

2. Background

It is known that a sensor is arranged on a side of a conveying device, with said sensor having at least one light transmitter for the transmission of a light beam in the direction of the conveying device and at least one light receiver for the reception of a light beam from the direction of the conveying device as well as an evaluation device for the evaluation of the light beam detected by the light receiver. A retroreflector is arranged on the side of the conveying device disposed opposite the sensor for the reflection of the transmitted light beam. When the transmitted light beam of the sensor is incident on the retroreflector, at least some of the light beam is transmitted back into its starting direction and is detected by the light receiver in the sensor.

In this manner, an optoelectronic sensor device is arranged transversely to the transport direction in the conveying device. If an object is moved into the light beam of the optoelectronic sensor device by the conveying device, the path of the light beam from the light transmitter to the light receiver is interrupted, i.e. the sensor can recognize that the object is located at the point within the conveying device at which the effective light beam of the sensor crosses the conveying device in the non-interrupted case. By this recognition of the beam interruption, the sensor triggers a switch signal which can be used for the carrying out of different actions such as the outputting of a status signal, a mechanical switch position, a weight detection or the like.

A particular demand in the detection of a conveyed object within a conveying device is that the geometrical detection location of the object frequently has to be determined precisely. This demand for a precise detection location has the disadvantage that an optical sensor as a rule has a tolerance zone in this respect which corresponds to the extent of the effective cross-section of the light beam in the transport direction. This can be explained by the fact that, for example, a new sensor having a high-quality retroreflector can only trigger a switch signal in the sensor when the object completely, or nearly completely, covers the cross-section of the light beam, in particular when said sensor and retroreflector are only used at a small distance from one another and do not have any contamination at the corresponding interfaces. In contrast to this, for example, a sensor having a retroreflector attached at a large distance can already trigger a switch signal in the sensor when the object only covers a small partial cross-section of the cross-section of the light beam, in particular when the optical interfaces additionally show high contamination. For this reason, with the known sensors, the cross-section of the light beam of the sensor is frequently kept very small, at least in the extent which is associated with the transport direction.

This is achieved, for example, in that the cross-section of the light beam is kept small both at the light exit and at the light entry at the sensor and in that the course of the cross-section of the light beam over the conveying device and on the retroreflector is strictly limited by means of a corresponding optical transmission and reception system. The geometrical tolerance zone caused by the cross-section of the light beam is thus necessarily considerably restricted. In other words: the finer the optically active cross-section of the light beam, the more precise the geometrical detection location of the object in the conveying device is determined.

This measure of restriction of the cross-section of the light beam has the disadvantage, however, that the adjustment of the sensor with respect to the oppositely disposed retroreflector is complex and necessarily does not only have the consequence of a high time effort for installation, but also a corresponding mechanical effort is also usually necessary in the form of an adjustable holding apparatus. In this respect, this adjustable holding apparatus must also be able to keep the carried out adjustment status stable over a long period, even under rough environmental influences, i.e. in the event of shock load and/or vibration load.

SUMMARY

It is desired to provide an improved light barrier which delivers an exact position determination of the object in the conveying device with a small installation and adjustment effort.

This object is satisfied by a light barrier in which a cylindrical reflector column has a plurality of retroreflecting elements, with the diameter of the reflector column being considerably smaller than the extent of the light beam perpendicular to the cylinder axis. This configuration provides that an optically effective detection beam of light is formed between the sensor and the reflector column whose cross-section at the sensor is determined by the light transmitter and by an optical transmission device and, in direct proximity to the reflector column, by the areal overlap of the light beam with the reflector column.

BRIEF DESCRIPTION OF THE DRAWINGS

This disclosure will be described more detail in the following with reference to an embodiment and to the drawing. There are shown in the drawing:

FIG. 4 a plan view of a reflector column with a regular polygonal cross-sectional surface.

DETAILED DESCRIPTION

Overview

Figure 1:
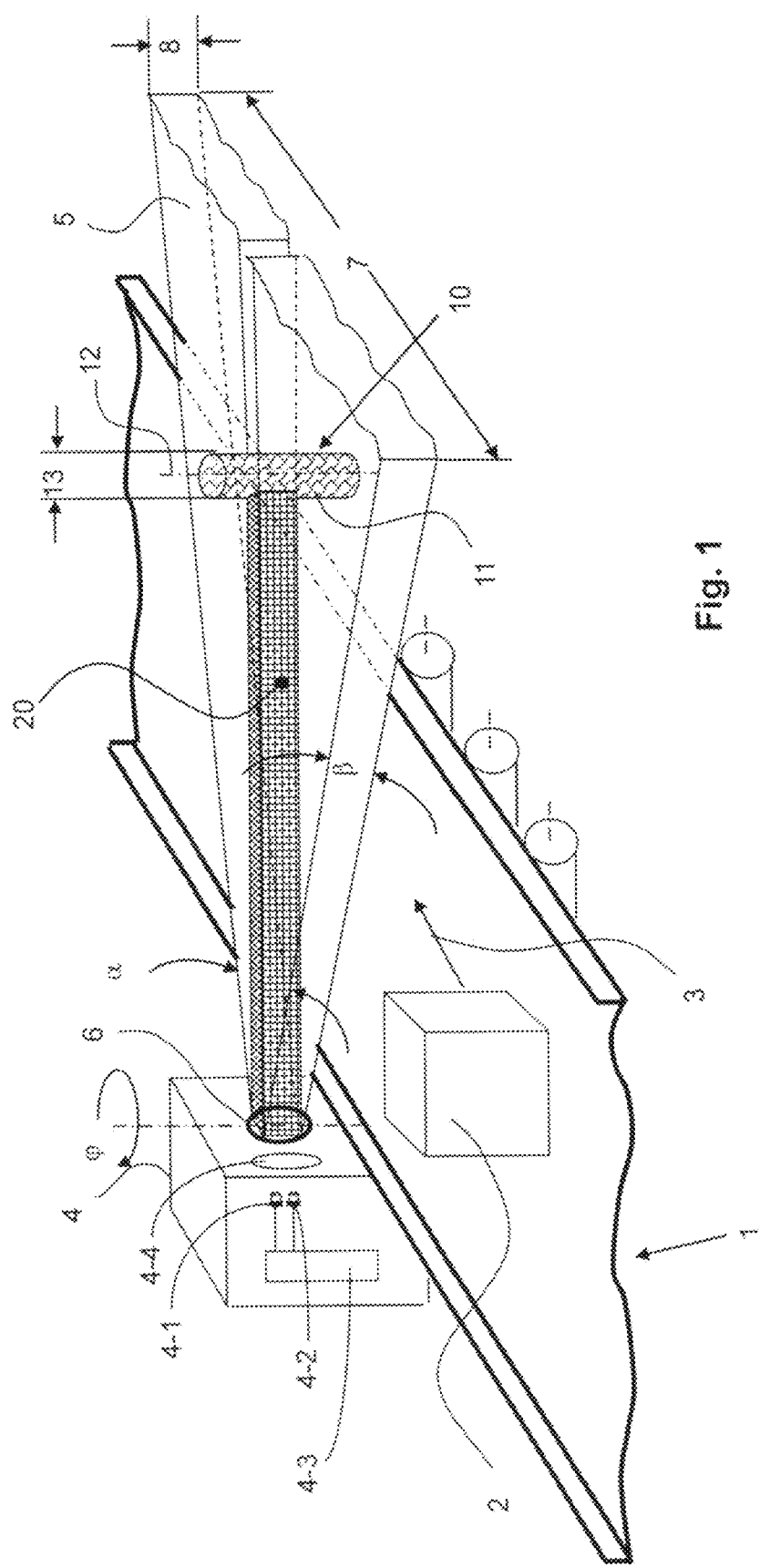
FIG. 1 a schematic representation of a conveying device with an optoelectronic sensor device.

The light barrier, in accordance with the disclosure, for the detection of an object which interrupts a beam of light of the light barrier includes a sensor having at least one light transmitter for the transmission of a light beam in the direction of a reflector, at least one light receiver for the reception of a reflected portion of the light beam as well as an evaluation device for the evaluation of the reflected light beam detected by the light receiver. The reflector is made as a cylindrical reflector column which has a plurality of retroreflecting elements aligned toward the outer surface, with the diameter of the reflector column being considerably smaller than the extent of the light beam perpendicular to the cylinder axis so that an optically effective detection beam of light is formed between the sensor and the reflector column whose cross-section at the sensor is determined by the light transmitter and an optical transmission device and, in direct proximity to the reflector column, by the areal overlap of the light beam with the reflector column.

A substantial advantage of the disclosed configuration is thus that the position of the effective detection beam of light between the sensor and the reflector column is only fixed by the location of the sensor and of the reflector column in the conveying device and is thus to a large extent independent of the optical alignment of the sensor and of the reflector column respectively. Complex adjustment holders for the exact optical alignment of the sensor and of the reflector column are thus no longer necessary with this configuration. Furthermore, the position of the detection beam of light is even in a stable association when the sensor device is exposed to a possible shock load or vibration load and the optical alignment of the sensor and/or of the reflector column would thereby change slightly.

In this respect, the reflector column is preferably equipped with a plurality of retroreflecting elements over the total periphery of its cylinder jacket so that the reflector column can be arranged independent of the position of angular rotation of its cylinder axis.

The light beam preferably has an elliptical or rectangular cross-sectional shape whose long axis is aligned perpendicular to the cylinder axis and whose short axis is aligned parallel to the cylinder axis.

Provision is made in one example configuration that the reflector column is much smaller, both in the transverse direction and in the direction of the cylinder axis, than the extents of the light beam at the location of the reflector column so that an optically effective detection beam of light is formed between the sensor and the reflector column whose cross-section in direct proximity to the reflector column is determined by the effective size of the reflector column. In this case, an effective detection beam of light positioned exactly between the sensor and the reflector column will likewise be formed for the function of the optoelectronic sensor device. An optical alignment of the sensor and of the reflector column respectively, i.e. a complex adjustment holder for the exact optical alignment of the sensor and of the reflector column, is thus also not necessary in this configuration. The light beam in this embodiment can, in a simple manner, have an approximately round or square cross-sectional shape, with the previously mentioned effective detection cross-section nevertheless being formed by the reflection at the reflector column.

Provision is made in an expedient embodiment that the outer surface of the reflector column has a transparent cylindrical surface form so that the light entry surface and the light exit surface of the retroreflecting elements in the reflector column have the characteristic of an optically effective cylindrical lens. It is thus achieved in an advantageous manner that the return beam direction of the light reflected at the retroreflecting elements of the reflector column can be changed by the superimposed effect of the cylindrical lens in dependence on the outer diameter of the reflector column. This can, for example, improve the effectiveness of the light transmission from the light transmitter to the light receiver when the sensor has a pupil division for the division of the transmission and reception beams.

Provision is made in another embodiment that the reflector column has a regular or irregular polygonal cross-sectional surface matched to the structure of the retroreflecting elements. In this way, no additional optical effect of the cylindrical lens which would have an effect in the form of a focusing or scattering of the reflected beam of light is superimposed on the surfaces on the retroreflecting elements in the reflector column. This is in particular of advantage when large ranges or different range regions should be bridged between the sensor and the reflector column.

Provision is made in an advantageous embodiment that the reflector column is designed as a hollow cylinder for the reception of further components of the sensor device. The inner space of the reflector column can thus simultaneously be utilized as a carrying body for additional electronic and/or optical components. An operating status indication, a display for signal feedback, a reflector encoding and the like can thus, for example, be installed in the inner space of the reflector column. This is especially of advantage when, for example, only the optical view contact to the reflector column is possible, but not to the optoelectronic sensor, due to construction circumstances.

Provision is made in a further development that the reflector column has a screw fastening or a clamping fastening at at least one end face for the installation of the reflector column. Since the reflector column can be used in any desired rotational position around the cylinder axis, the fastening of the reflector column within the conveying device is possible with a small effort and without complex optical adjustment. This in particular proves to be advantageous when the conveying device has to be reconfigured frequently as required for the carrying out of different tasks.

Configuration

In accordance with FIG. 1, an object 2 is located on a conveying device 1 and is moved in a transport direction 3 by means of the conveying device 1. An optoelectronic sensor 4 is arranged at a side of the conveying device 1. The sensor 4 includes, among other things, a light transmitter 4-1, a light receiver 4-2, an optical transmission and reception device 4-4 and an evaluation unit 4-3. For a better overview, these components contained in the sensor 4 are only shown very schematically in FIG. 1.

The light emitted by the light transmitter is shaped with the help of the optical transmission device 4-4 installed in the sensor 4 such that it exits the sensor 4 in the direction of the conveying device 1 as a light beam 5 from a sensor window 6 of the sensor 4. As can be seen from FIG. 1, the light beam 5 has a horizontal opening angle $\alpha$ in the plane of the transport direction 3 and a vertical opening angle $\beta$ at a right angle to the transport direction 3. Since the horizontal opening angle $\alpha$ is much larger than the vertical opening angle $\beta$, the cross-section of the light beam 5 adopts a substantially rectangular contour with increasing distance from the sensor 4. The cross-section of the light beam 5 thus has a long axis 7 and a short axis 8.

A cylindrical reflector column 10 is arranged at the side of the conveying device 1 disposed opposite the optoelectronic sensor 4. A plurality of retroreflecting elements 11 are arranged, preferably all around, at the outer surface of the reflector column 10 and reflect the light incident on them back in the direction of the incidence of light again. The cylindrical reflector column 10 has a cylinder axis 12 and a cylinder diameter 13. The cylinder axis 12 of the reflector column 10 is in this respect arranged approximately parallel to the short axis 8 of the light beam 5.

As can furthermore be seen from FIG. 1, the cylinder length of the reflector column 10 is much larger than the short axis 8 of the light beam 5; simultaneously, however, the diameter 13 of the reflector column 10 is substantially smaller than the long axis 7 of the light beam 5. This has the consequence that only a small portion of the light beam 5 is incident onto the reflector column 10 and is in this respect reflected back to the senor 4 by the retroreflecting elements 11 of the reflector column 10. A detection beam of light 20 is thus produced whose cross-section at the sensor 4 is limited by the light transmitter 4-1 and by the optical transmission device 4-4 and, where applicable, also by the size of the sensor window 6 and is preset at the reflector column 10 by its cylinder diameter 13 and by the short axis 8 of the light beam 5.

If the object 2 is moved in the transport direction 3 by the conveying device 1, the sensor 4 will thus only trigger a switching procedure when the detection beam of light 20 is interrupted by the object 2. The situation is decisive in this connection that the geometrical association of the detection beam of light 20 with the conveying device 1 is only exactly positioned by the location of the sensor 4 and of the reflector column 10. A rotation of the sensor 4 around an angle of rotation φ thus has no effect on the geometrical association of the detection beam of light 20 with the conveying device 1. The functional readiness of the sensor device is also not impaired by a change in the angle of rotation φ as long as the reflector column 10 is still located within the light beam 5. Equally, the alignment of the reflector column 10 about its cylinder axis 12 is also not necessary, i.e. the association of the detection beam of light 20 with the conveying device 1 is also not influenced by it.

Figure 2:
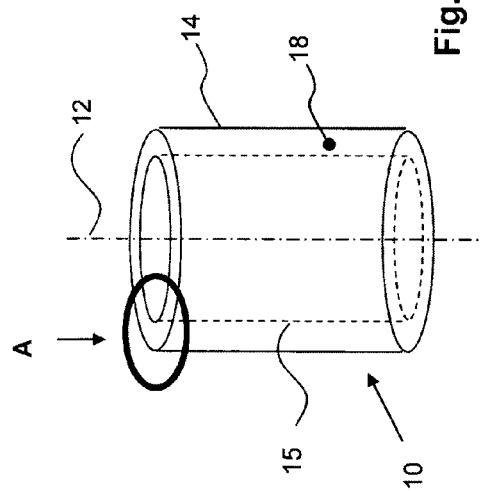
FIG. 2 a perspective representation of a reflector column in the form of a hollow cylinder.

A perspective representation of the reflector column 10 can be seen in FIG. 2. It can be recognized from this schematic view that this embodiment variant of the reflector column 10 corresponds to a hollow cylinder made from an optically transparent material 18 and having a cylindrical shape at its outer jacket surface 14. The specific geometrical embodiment of the inner wall 15 of the hollow cylinder should be explained in detail with reference to FIG. 3.

Figure 3:
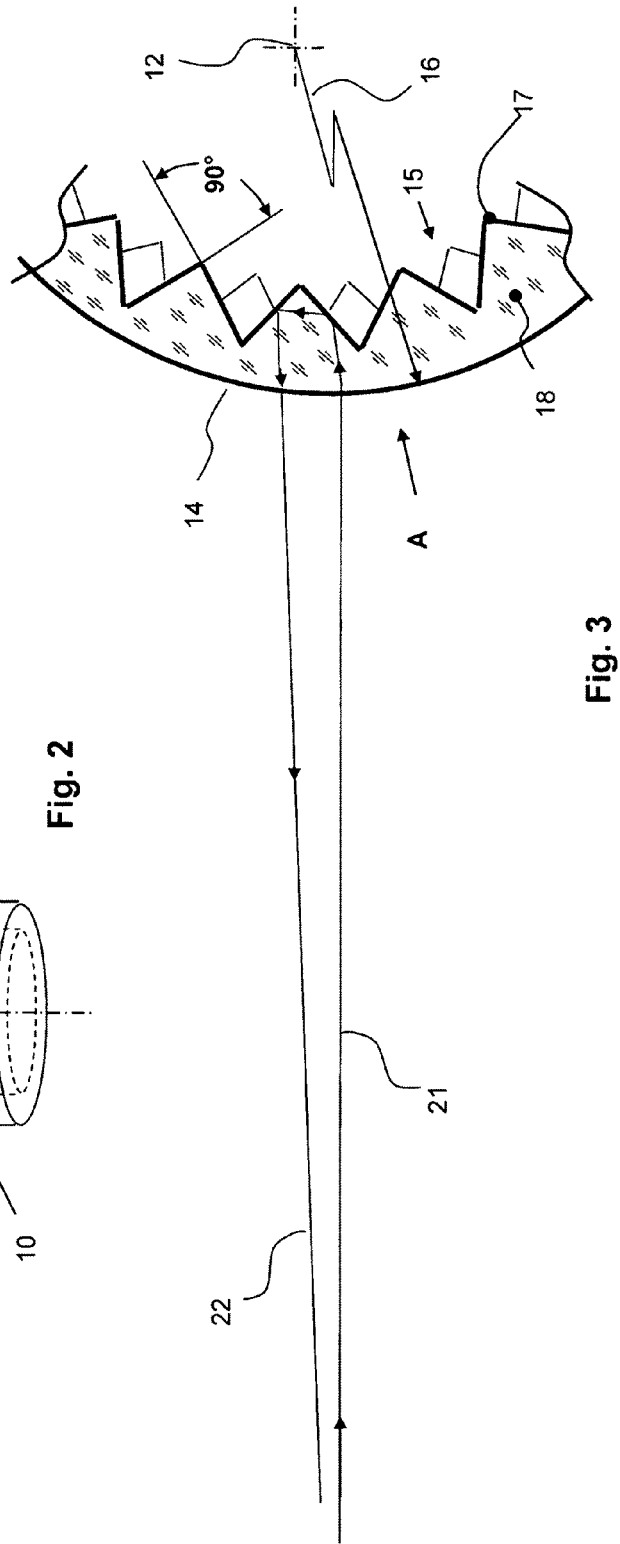
FIG. 3 a plan view of detail A of FIG. 2.

For this purpose, the detail A drawn in FIG. 2 is shown magnified in FIG. 3, with the form of the plan view having been chosen as the direction of gaze. In this respect, both the outer jacket surface 14 and in particular the inner wall 15 of the hollow cylinder can be recognized. The outer jacket surface 14 is arranged in circular form about the cylinder axis 12 in a radium 16. The inner wall 15 of the hollow cylinder, in contrast, has a hexagonal array of small cube corners in the embodiment variant of the reflector column 10 shown here. These cube corners have, as is also the case with a flat, triple reflector, the function of a retroreflecting element 17. The wall of the hollow cylinder of the reflector column 10 has the function of a retroreflector curved in circular form due to this embodiment of the inner wall 15. If now an incident beam of light 21 is incident into the wall of the hollow cylinder via the outer jacket surface 14, and thus onto a retroreflecting element 17, it will exit the jacket surface 14 again as a reflected beam of light 22 due to multiple reflections or total reflections. In contrast to a non-curved retroreflector, however, due to the curved outer jacket surface 14, the incident beam of light 21 and the reflected beam of light 22 do not extend exactly in parallel with respect to one another, but rather have a certain convergence with respect to one another in dependence on the radius 16 and on the refractive index of the optically transparent material 18. This convergence between the incident beam of light 21 and the reflected beam of light 22 is, however, only present in the plane of the drawing shown here.

In the embodiment variant of the reflector column 10 shown in FIG. 4, the base surface of the reflector column 10 has the shape of a regular dodecagon. In this respect, the size of an individual chord 19 is selected so that it exactly corresponds to the width of 3 adjacent retroreflecting elements 17. It is naturally equally possible to make the reflector column 10 in a different polygonal variant and in a corresponding number of retroreflecting elements 17. The decisive difference from the reflector column 10 shown in FIGS. 2 and 3 can be seen, in the embodiment in accordance with FIG. 4, in the fact that the retroreflecting elements 17 are outwardly closed by a planar light incidence surface. A convergence/divergence between the incident beams of light and the reflected beams of light is thus precluded. Furthermore, it can be seen from the representation of FIG. 4 that the width 23 of the detection beam of light is smaller than the outer diameter of the reflector column 10. The reason for this is that only that portion of the light beam 5 incident onto the reflector column 10 is reflected back as a detection beam of light 20 which is incident, within a certain acceptance angle γ onto the reflector column 10 or onto the retroreflecting elements 17 respectively. If this acceptance angle γ is exceeded, the beam of light can no longer be sufficiently reflected in the retroreflecting element 17, i.e. no more retroreflection takes place.

REFERENCE NUMERAL LIST

1 conveying device
2 object
3 transport direction
4 sensor with light transmitter 4-1, light receiver 4-2, optical transmission device 4-4 and evaluation unit 4-3
5 light beam
6 sensor window
7 long axis
8 short axis
10 reflector column
11 retroreflecting element
12 cylinder axis
13 cylinder diameter
14 jacket surface
15 inner wall
16 radius
17 retroreflecting element
18 transparent material
19 chord
20 detection beam of light
21 incident beam of light
22 reflected beam of light
23 width of detection beam of light
α horizontal angle
β vertical angle
φ angle of rotation
γ acceptance angle

The invention claimed is:
1. A light barrier for the detection of an object which interrupts a beam of light of the light barrier, comprising:
 a sensor with at least one light transmitter for the transmission of a light beam in the direction of a reflector;
 at least one light receiver for the reception of a reflected portion of the light beam; and
 an evaluation unit for the evaluation of the reflected light beam detected by the light receiver,
 wherein the reflector is made as a cylindrical reflector column which has a plurality of retroreflecting elements aligned toward the outer surface, with the diameter of the reflector column being considerably smaller than the extent of the light beam perpendicular to the cylinder axis so that an optically effective detection beam of light is formed between the sensor and the reflector column whose cross-section at the sensor is determined by the light transmitter and by an optical transmission device and, in direct proximity to the reflector column, by the areal overlap of the light beam with the reflector column, and wherein the reflector column has a regular or irregular polygonal cross-sectional surface matched to the structure of the retroreflecting elements.

2. A light barrier in accordance with claim 1, wherein the light beam has an elliptical or rectangular cross-sectional form whose long axis is aligned perpendicular to the cylinder axis and whose short axis is aligned parallel to the cylinder axis.

3. A light barrier in accordance with claim 1, wherein the reflector column is considerably smaller, both in the transverse direction and in the direction of the cylinder axis, than the extents of the light beam at the location of the reflector column so that an optically effective detection beam of light is formed between the sensor and the reflector column whose cross-section in direct proximity to the reflector column is determined by the effective size of the reflector column.

4. A light barrier in accordance with claim 3, wherein the light beam has an approximately round or square cross-sectional form.

5. A light barrier in accordance with claim 1, wherein the outer surface of the reflector column has a transparent cylindrical surface so that the light entry surface and the light exit surface of the retroreflecting elements have an optically effective cylindrical shape in the reflector column.

6. A light barrier in accordance with claim 1, wherein the reflector column is made as a hollow cylinder for the reception of further components of the light barrier.

7. A light barrier in accordance with claim 1, wherein the light barrier has a configuration to direct the light beams across a conveying device for the detection of objects conveyed in a transport direction, with the sensor being arranged on one side of the conveying device and the reflector column being arranged on the side of the conveying device disposed opposite the sensor.

8. A light grid in accordance with claim 1, wherein the reflector column has a screw fastening or a clamping fastening in at least one end surface for the installation of the reflector column at the conveying device.

* * * * *